United States Patent [19]

Otowa

[11] Patent Number: 5,538,611
[45] Date of Patent: Jul. 23, 1996

[54] PLANAR, FLOW-THROUGH, ELECTRIC, DOUBLE-LAYER CAPACITOR AND A METHOD OF TREATING LIQUIDS WITH THE CAPACITOR

[75] Inventor: Toshiro Otowa, Shiga, Japan

[73] Assignee: Marc D. Andelman, Worcester, Mass.

[21] Appl. No.: 379,493

[22] PCT Filed: May 12, 1994

[86] PCT No.: PCT/US94/05364

§ 371 Date: Jan. 27, 1995

§ 102(e) Date: Jan. 27, 1995

[87] PCT Pub. No.: WO94/26669

PCT Pub. Date: Nov. 24, 1994

[30] Foreign Application Priority Data

May 17, 1993 [JP] Japan ................................. 5-139354

[51] Int. Cl.⁶ ........................... B01D 17/06; B03C 5/02; C10G 33/02
[52] U.S. Cl. ...................... 204/550; 204/518; 204/551; 204/554; 204/600; 204/627; 204/665; 204/673
[58] Field of Search ................. 204/299 R, 130, 204/131, 136, 149, 180.1, 182.5, 186, 188, 189, 190, 191, 302; 361/502; 210/243, 541, 198.1

[56] References Cited

U.S. PATENT DOCUMENTS

| | | | |
|---|---|---|---|
| 3,615,829 | 10/1971 | Sprague | 136/6 |
| 3,658,674 | 4/1972 | Benak | 204/108 R |
| 3,859,195 | 1/1975 | Williams | 204/272 |
| 3,883,412 | 5/1975 | Jensen | 204/149 |
| 4,597,028 | 6/1986 | Yoshida et al. | 361/305 |
| 4,814,145 | 3/1989 | Yoshida et al. | 422/150 |
| 5,260,855 | 11/1993 | Kaschmitter et al. | 361/502 |
| 5,425,858 | 6/1995 | Farmer | 204/149 |

OTHER PUBLICATIONS

Johnson et al, "The Electrosorb Process for Desalting Water" Mar. 1970, The Office of Saline Water Research and Development Progress Report No. 516, U.S. Dept. of the Interior PB 200 056.

Johnson et al, "Desalting by Means of Porous Carbon Electrodes", Mar. 1971, pp. 510–517, J. Electrochem. Soc. Electrochemical Technology (vol. 118, No. 3).

Ganzi et al, "Water Purification and Recycling Using the CDI Process", Feb. 1992, pp. 49–53, Environmental Progress (vol. 11, No. 1).

Primary Examiner—John Niebling
Assistant Examiner—Edna Wong
Attorney, Agent, or Firm—Richard P. Crowley

[57] ABSTRACT

The object of the invention is to provide a flow-through, electric, double-layer capacitor providing for a high, steady rate of removal of ionic substances and amenable to commercial scale application and a method of treating fluids using the flow-through electric double-layer capacitor. The invention is a planar, flow-through, electric, double-layer capacitor comprising a separator (1) consisting in an electrically-insulating, porous, flow-through sheet, activated carbon layers (2, 2), each comprising a high specific surface area activated carbon as a main component, collectors (3, 3) disposed externally of the active carbon layers (2, 2), and retaining plates (4, 4) disposed externally of the collectors (3, 3). A fluid containing ionic substances is treated by passing the fluid through the planar, flow-through, electric, double-layer capacitor and repeating, in alternate cycles, application of a direct current constant voltage to collectors (3, 3) and short-circuiting or reversal of connection between collectors (3, 3).

27 Claims, 6 Drawing Sheets

PLANAR, FLOW-THROUGH, ELECTRIC, DOUBLE-LAYER CAPACITOR AND A METHOD OF TREATING LIQUIDS WITH THE CAPACITOR

BACKGROUND OF THE INVENTION

The method is known by which ionic substances are removed from water containing them by the utilization of electrostatic forces using an electric double-layer capacitor.

For example, the specification of U.S. Pat. No. 5,192,432 describes a flow-through capacitor for controlled charge chromatography comprising a spirally wound plurality of adjacent layers including a first electrically conductive backing layer, a first high surface area conductive layer, a first non-conductive porous spacer layer, a second conductive backing layer, a second high surface area conductive layer and a second non-conductive porous spacer layer. It is also shown in the same specification that this capacitor finds application in, for example, the purification of water containing ionic substances, such as sodium chloride.

SUMMARY OF THE INVENTION

The invention relates to a flow-through, electric, double-layer capacitor of planar configuration utilizing active carbon layers. The invention further relates to a method of treating a fluid containing ionic substances with this flow-through, electric, double-layer capacitor of planar configuration.

The flow-through capacitor disclosed is U.S. Pat. No. 5,192,432 is of interest. However, since this flow-through capacitor comprises a plurality of adjacent layers in a spirally wound form, channeling tends to occur on passage of a fluid, and it was found that when this flow-through capacitor is applied to the purification of a liquid containing ionic solutes, the rate of removal of the ionic substances is not constant but fluctuates and, moreover, the mean rate of removal is fairly lowered. It was thus discovered that this flow-through capacitor can hardly be employed in the purification of liquids on an industrial scale.

Under the circumstances, this invention has for its object to provide a flow-through, electric, double-layer capacitor providing for high and steady rates of removal of ionic substances and for industrial-scale application and a method of treating fluids with said flow-through, electric, double-layer capacitor.

The planar, flow-through, electric, double-layer capacitor of the invention comprises a separator (1) consisting in an electrically-insulating, porous, flow-through sheet, active carbon layers (2), (2) each comprising a high specific area activated carbon as disposed on either side of said separator (1), collector electrodes (3), (3) disposed externally of said active carbon layers (2), (2) and retaining plates (4), (4) disposed externally of said collector electrodes (3), (3).

The method of treating a fluid according to the invention is characterized in that while a fluid containing ionic substances is passed through said planar, flow-through, electric, double-layer capacitor, application of a direct current constant voltage to the collectors (3), (3) and short circuiting or reversed connection between the two collectors (3), (3) are alternately repeated.

The invention is now described in detail.

The separator (1) is an electrically-insulating, organic or inorganic sheet across which fluids are ready to flow, such as filter paper, a porous polymer film, a woven cloth or a nonwoven cloth, for instance. The thickness of the separator is about 0.01 mm to 0.5 mm and preferably about 0.02 mm to 0.3 mm.

The active carbon layers (2), (2) are layers each comprising a high specific area activated carbon as a main component. The high specific area activated carbon mentioned above means an activated carbon with a BET specific surface area of not less than 1000 $m^2/g$, preferably not less than 1500 $m^2/g$ and, for still better results, 2000 $m^2/g$ to 2500 $m^2/g$. When the BET specific surface area of carbon is too small, the rate of removal of ionic substances from a fluid is low. If the BET specific surface area is too large, the rate of removal of ionic solutes rather tends to decrease, suggesting that it is not mandatory to provide for more than necessary expansion of BET surface area.

The form of activated carbon is optional. Thus, it may, for example, be powdery, granular or fibrous. The powdery or granular activated carbon is used as molded into a board or sheet. The fibrous activated carbon is formed into a web for use. The use of powdery or granular activated carbon in a board or sheet form is costwise by far more advantageous than the use of a web or fabric made of fibrous carbon.

The forming of a board or sheet can be made by, for example, mixing a powdery or granular activated carbon with a binder (polytetrafluoroethylene, phenolic resin, carbon black, etc.) and/or a dispersing medium (solvents, etc.), forming the admixture into a board or sheet and subjecting it to appropriate heat treatment. When such boards or sheets are used as the active carbon layers (2), (2), the boards or sheets may be drilled or otherwise machined beforehand. The technologies relating to the application of an activated carbon board or sheet are disclosed in JP Kokai S-63-107011, H-3-122008, H-3-228814, S-63-110622, S-63-226019 and S-64-1219, among others, and reference can be had to these disclosures.

The thickness of active carbon layers (2), (2) is usually about 0.1 mm to 3 mm, and preferably about 0.5 mm to 2 mm, but this range is not necessarily critical.

As the collectors (3), (3), electrodes made of good electrical conductor material, such as copper plates, aluminum plates, carbon boards, graphite foils, etc., and amenable to intimate contact with the active carbon layers (2), (2) are employed. The thickness of collectors (3), (3) is not critical but is about 0.1 mm to 0.5 mm in many instances. For facilitating the application of a voltage, the collectors (3), (3) are usually provided with leads (3a).

The retaining plates (4), (4) are hardly-deformable plates made of electrically insulating material, for example, plastic plates. The retaining guides (4), (4) can be formed with fluid inlet and outlet means, holes for fastening bolts, etc.

Preferably disposed between the collectors (3), (3) and retaining plates (4), (4) are frame-shaped gaskets (5), (5). Instead of providing such independent gaskets (5), (5), the retaining plates (4), (4) may be provided with sealing members.

Using the above component members, a planar, flow-through, electric, double-layer capacitor is fabricated in the construction of retaining plate (4)/gasket (5)/collector (3)/active carbon layer (2)/separator (1)/active carbon layer (2)/collector (3)/gasket (5)/retaining plate (4).

A fluid containing ionic substances is treated using the planar, flow-through, electric, double-layer capacitor of the above construction. Treatment of a fluid, as the terms are used herein, means not only a treatment for purification of water, conversion of sea water to fresh water, denitrogenation of effluents, etc., but also a treatment for the trapping and recovery of noble metals, purification of inorganic salts, quantitative determination of dissolved ions and so forth. The fluid includes various liquids based upon water or other inorganic solvents, organic solvents or mixtures thereof and even may, for example, be blood. The ionic substance includes electrolytes which are dissociated in solution and chargeable substances, such as metallic salts, amine salts, ammonium salts, inorganic acids, organic acids, etc.

The treatment of a fluid containing ionic substances in accordance with this invention comprises the following steps:

A planar, flow-through, electric, double-layer capacitor is fabricated and a fluid containing ionic substances is introduced from its fluid inlet by means of a delivery pump, for instance.

Using a direct current constant voltage source, a voltage of about 0.5 volts to 5 volts (up to about 2 volts in the case of an aqueous solution to avoid electrolysis of water) or in the neighborhood of the above range is applied to the terminals of collectors (3), (3).

In the case of an aqueous solution:

The fluid at the fluid outlet is monitored with a conductivity meter or the like and short-circuiting (or reversal of connection) and voltage application are alternately performed at suitable timings. Time control with a timer is also possible. On short-circuiting (or reversed connection), the ionic substances electrically absorbed on the active carbon layers (2), (2) are desorbed and discharged in concentrated form from the fluid outlet.

The principle of treatment of a fluid containing ionic solutes using the planar, flow-through, electric, double-layer capacitor of this invention, taking the case in which said fluid containing ionic solutes is a saline solution, viz. an aqueous solution of sodium chloride, as an example, is illustrated in FIG. 6.

As shown in FIG. 6(a), which represents the voltage application mode, the sodium in the aqueous solution introduced is electrically adsorbed on the active carbon layer (2) adjacent the anode collector (3), while the chloride ion is electrically adsorbed on the active carbon layer (2) adjacent the cathode collector (3), with the result that the sodium chloride concentration of the solution at the outlet is considerably reduced. As the passage of the aqueous solution is continued, the adsorption of the two ions on the active carbon layers (2), (2) reaches a point of saturation so that the sodium chloride concentration at the outlet approaches to the corresponding concentration of the initial solution. As short circuiting or reversal of connection is made between the cathode side and anode side at an appropriate timing, or on the mode represented by FIG. 6(b), the sodium and chloride ions adsorbed on the active carbon layers (2), (2) are desorbed, with the result that an aqueous solution of remarkably increased sodium chloride concentration than the initial solution is discharged from the fluid outlet. If a contrivance, such as reduction of the rate of passage, is instituted at this time, the sodium chloride concentration of the outlet fluid is further increased.

Since the invention utilizes flat, active carbon layers (2), (2) and adopts a clamped, flat assemblage of component parts, the active carbon layers (2), (2) are uniformly compacted so that channeling can be effectively prevented. As a consequence, the rate of removal of ionic substances is stabilized and, in addition, can be enhanced to the practically maximum level.

EXAMPLES

The following examples are further illustrative of this invention.

Fabrication of a Flow-Through Electric Double-Layer Capacitor

Hardware

FIG. 1 is a disassembled view of the flow-through, electric, double-layer capacitor according to the invention and FIG. 2 is an assembled view of the capacitor of FIG. 1. In FIG. 2, the collectors (3), (3) are shown in sectional view.

The following component parts were provided, and the flow-through, electric, double-layer capacitor of FIG. 2 was constructed.

(1) represents a planar separator made of filter paper with a thickness of about 0.2 mm.

(2), (2) represent active carbon layers, each measuring 120 mm×120 mm and having a specific gravity of 0.4. Thus, petroleum coke was activated with potassium hydroxide to provide a granular activated carbon with a high specific surface area (BET) of 2200 $m^2/g$. This carbon was then mixed with polytetrafluoroethylene, carbon black and suitable dispersing medium, and the mixture was compression molded into a 1.0 mm thick board. The proportion of activated carbon in the formulation was 80 weight % and the combined amount of activated carbon in the two active carbon layers (2), (2) was 10 g.

(3), (3) represent collectors. Each is made of graphite in the form of a 125 μm thick foil. The lower half of one collector (3) is provided with flow-through orifices (3b) about 1 mm in diameter each, and the upper half of the other collector (3) is provided with similar flow-through orifices (3b). Each of these collectors (3), (3) is further provided with a terminal (3a).

(4), (4) represent retaining plates. Each is a 10 mm thick polymethyl methacrylate plate. The peripheral margin of each retaining plate (4), (4) is provided with bolt holes (8). Furthermore, one of the retaining plates (4), (4) is provided with a fluid inlet (6) at the lower corner, and the other retaining plate (4) is provided with a fluid outlet (7) at the diagonally opposite upper corner.

(5), (5) represent frame-shaped gaskets each 1 mm in thickness. Each is a die-cut piece in the form of a frame from a silicone rubber sheet.

The above component members were laid out as illustrated in FIG. 1 and assembled with bolts and nuts (9) to fabricate the flow-through, electric, double-layer capacitor illustrated in FIG. 1.

Treatment of a Fluid-Containing Ionic Substance Treatment Example 1

Using the flow-through, electric, double-layer capacitor fabricated as above, with the terminals (3a), (3a) of its collectors (3), (3) being connected to a 1 volt direct current source as shown in FIG. 2, a saline solution of 0.01 mole/æ concentration was introduced from the fluid inlet (6) of the retaining plate (4) and allowed to flow out from the fluid outlet (7).

The relations between the cumulative volume of saline solution passed and the sodium chloride concentration of the outlet solution at the flow rates of 0.9 ml/min and 9.1 ml/min are plotted in FIG. 3.

It is apparent from FIG. 3 that as a constant voltage of 1 volt was applied, the outlet NaCl concentration fell rapidly so that a maximum of 93% of sodium chloride was removed at the flow rate of 0.9 ml/min or a maximum of 70% of NaCl was removed at 9.1 ml/min.

Treatment Example 2

FIG. 4 is a graph showing the relation between the cumulative volume of saline passed and the sodium chloride concentration of the outlet fluid when saline was passed through the flow-through, electric, double-layer capacitor of FIG. 2, and application of the constant voltage and short circuiting were alternately repeated.

Using the same flow-through, electric, double-layer capacitor fabricated above, with the terminals (3a), (3a) of its collectors (3), (3) being connected to a direct current source of 1 volt, a saline solution of 0.01 mole/æ concentration was introduced at a flow rate of 0.9 ml/min from the fluid inlet (6) of the retaining plate (4) and allowed to flow out from the fluid outlet.

Application of a constant voltage of 1 volt and short-circuiting were alternately repeated according to the timing schedule indicated in FIG. 4, and the concentration of sodium chloride in the solution discharged from the fluid outlet (7) was determined. The results are plotted in FIG. 4.

It is apparent from FIG. 4 that the application of a constant voltage of 1 volt resulted in a sharp decrease in outlet NaCl concentration with 93% removal of sodium chloride, that short circuiting resulted in the discharge of a fluid of about four-fold increased NaCl concentration at the maximum, that as application of the voltage was restarted when the outlet NaCl level had declined close to the concentration of the initial solution, the outlet sodium chloride concentration fell rapidly with 93% removal of NaCl at the maximum, and that the subsequent short circuiting resulted in the discharge of a fluid of about four-fold increased NaCl concentration. It is also clear that since the same results were obtained even when the above pattern was repeated more than 10 times, the stability of this deionizing system is outstanding.

Treatment Example 3

A flow-through, electric, double-layer capacitor similar to the capacitor described under *Hardware* was fabricated, except that a felt made of fibrous, activated carbon with a BET specific surface area of 1450 $m^2/g$ was employed for each of the active carbon layers (2), (2).

Using the above flow-through, electric, double-layer capacitor, with the terminals (3a), (3a) of its collectors (3), (3) being connected to a direct current source of 1 volt as illustrated in FIG. 2, a saline solution of 0.01 mole/æ concentration was passed from the fluid inlet (6) of the retaining plate (4) and allowed to flow out from the fluid outlet (7).

The relations between the cumulative volume of the fluid passed and the sodium chloride concentration of the outlet fluid at the flow rates of 1.0 ml/min and 10 ml/min are plotted in FIG. 5. The flow rates are the rates per 10 grams of fibrous carbon constituting the two active carbon layers (2), (2).

It is apparent from FIG. 5 that application of a constant voltage of 1 volt results in a sharp reduction of outlet NaCl concentration, and that while the rate of NaCl removal at the flow rate of 1.0 ml/min is very high, the rate of NaCl removal is still high even at 10 ml/min.

EFFECTS OF THE INVENTION

As noted in the section of Effect, since the flow-through, electric, double-layer capacitor of this invention employs flat, active carbon layers (2), (2) and comprises a clamped, planar assembly of component members, the active carbon layers (2), (2) are uniformly compacted so that channeling of fluid can be effectively prevented. As a consequence, the stability of the rate of removal of ionic substances is increased and, moreover, the rate of removal can be enhanced to the practically maximum level. Furthermore, since the capacitor is of low profile even when it is scaled up, it is easy to provide for an increased treatment capacity through the arrangement of unit capacitors in a parallel array. Thus, the invention enables the treatment of fluids on a commercial scale.

Figure 1:
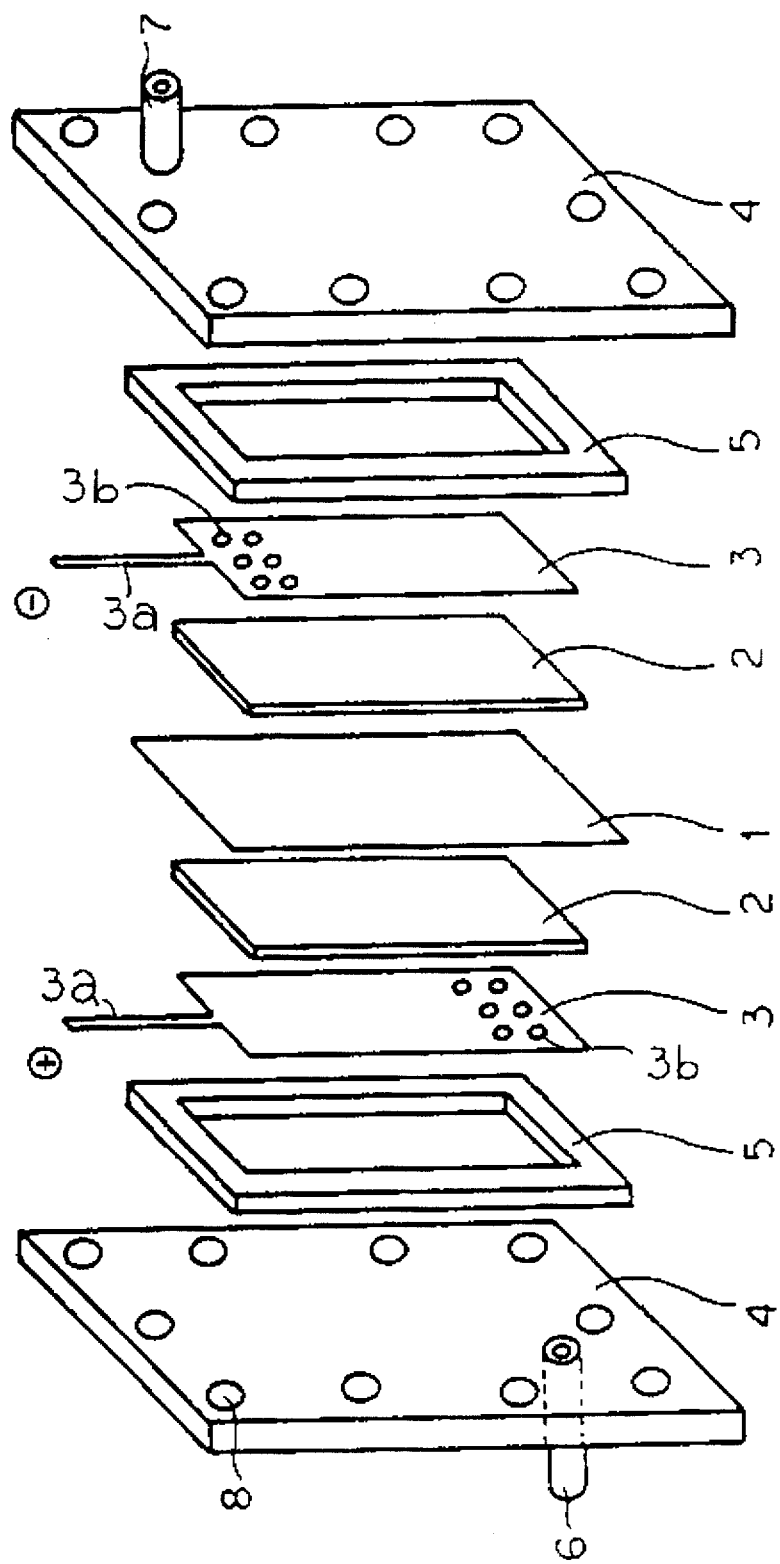
FIG. 1 is a disassembled view of the flow-through, electric, double-layer capacitor of the invention.
Figure 2:
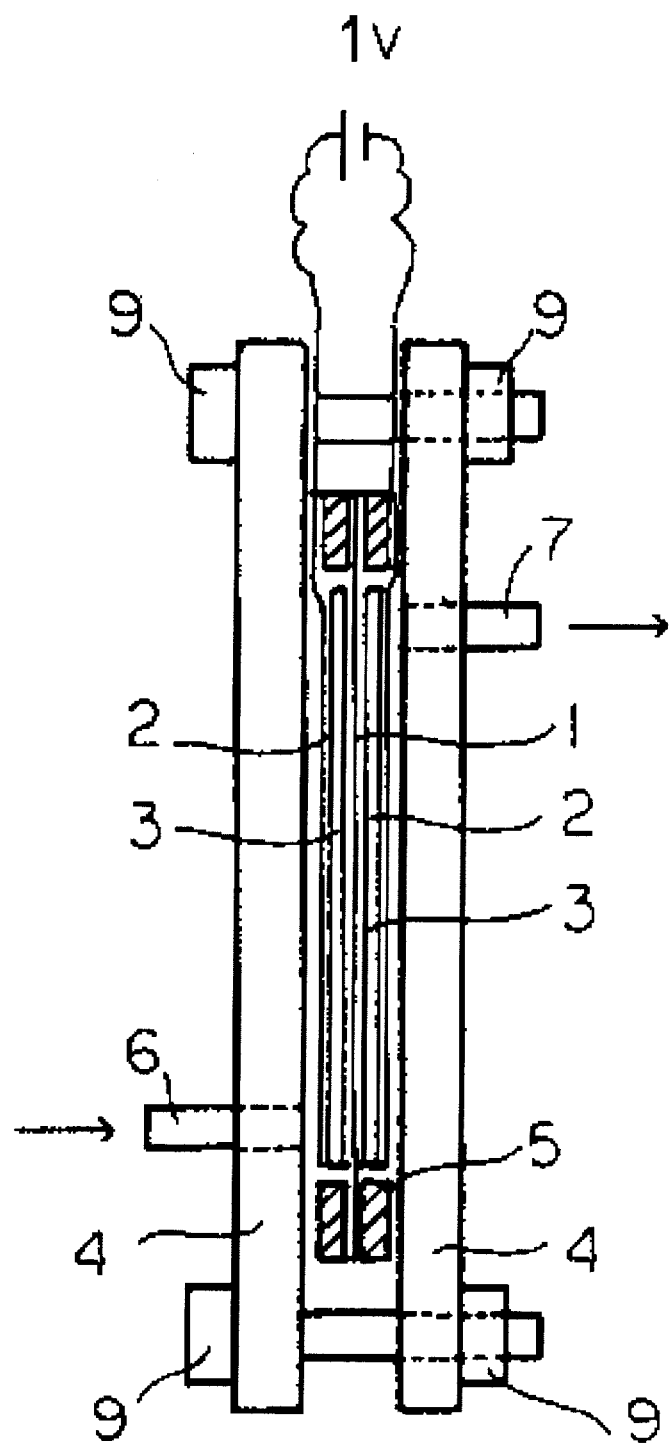
FIG. 2 is an assembled view of the flow-through, electric, double-layer capacitor of FIG. 1.
Figure 3:
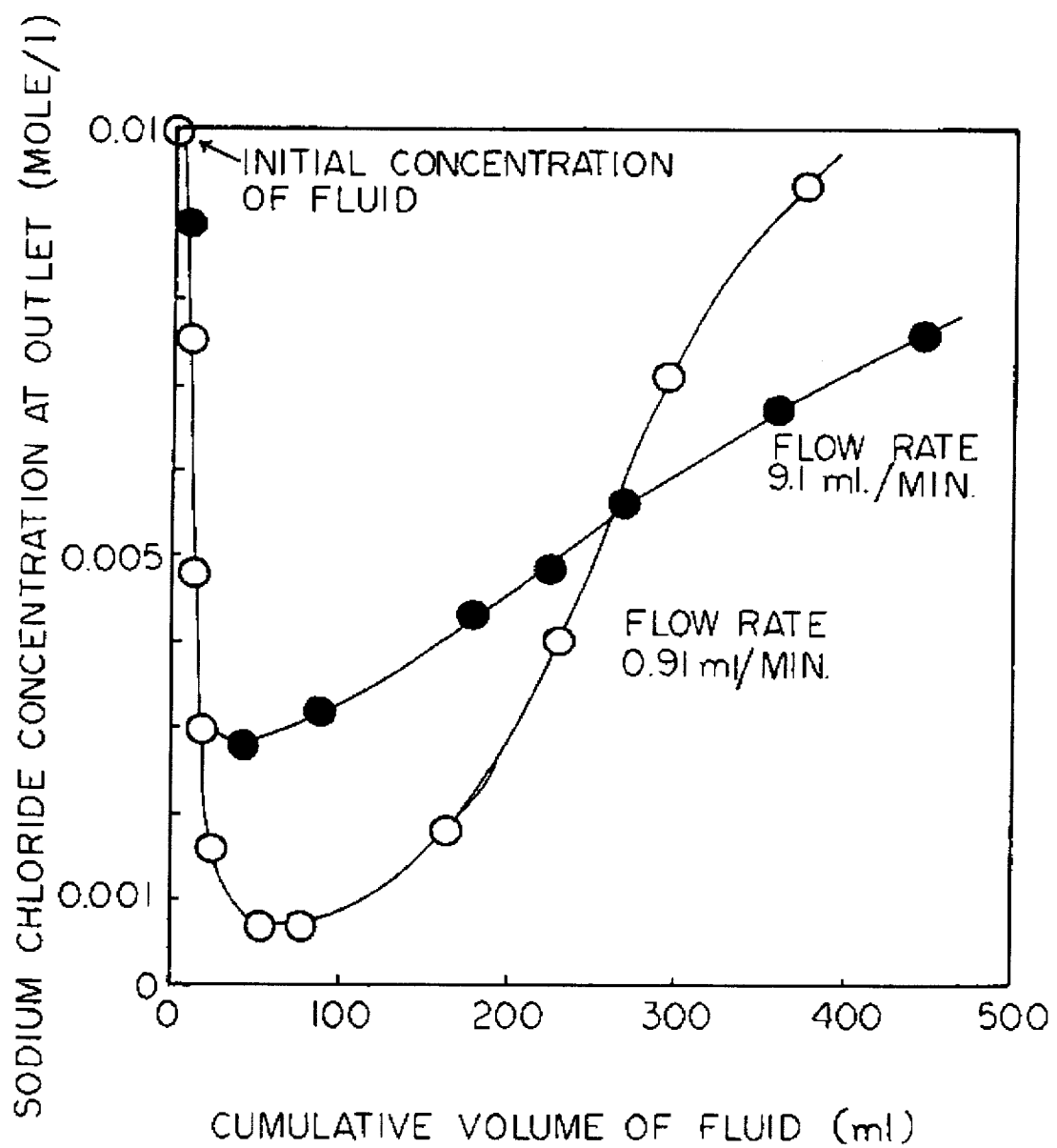
FIG. 3 is a graph showing the relations between the cumulative volume of saline passed and the outlet NaCl concentration at the flow rates of 0.9 ml/min and 9.1 ml/min in Treatment Example 1.
Figure 4:
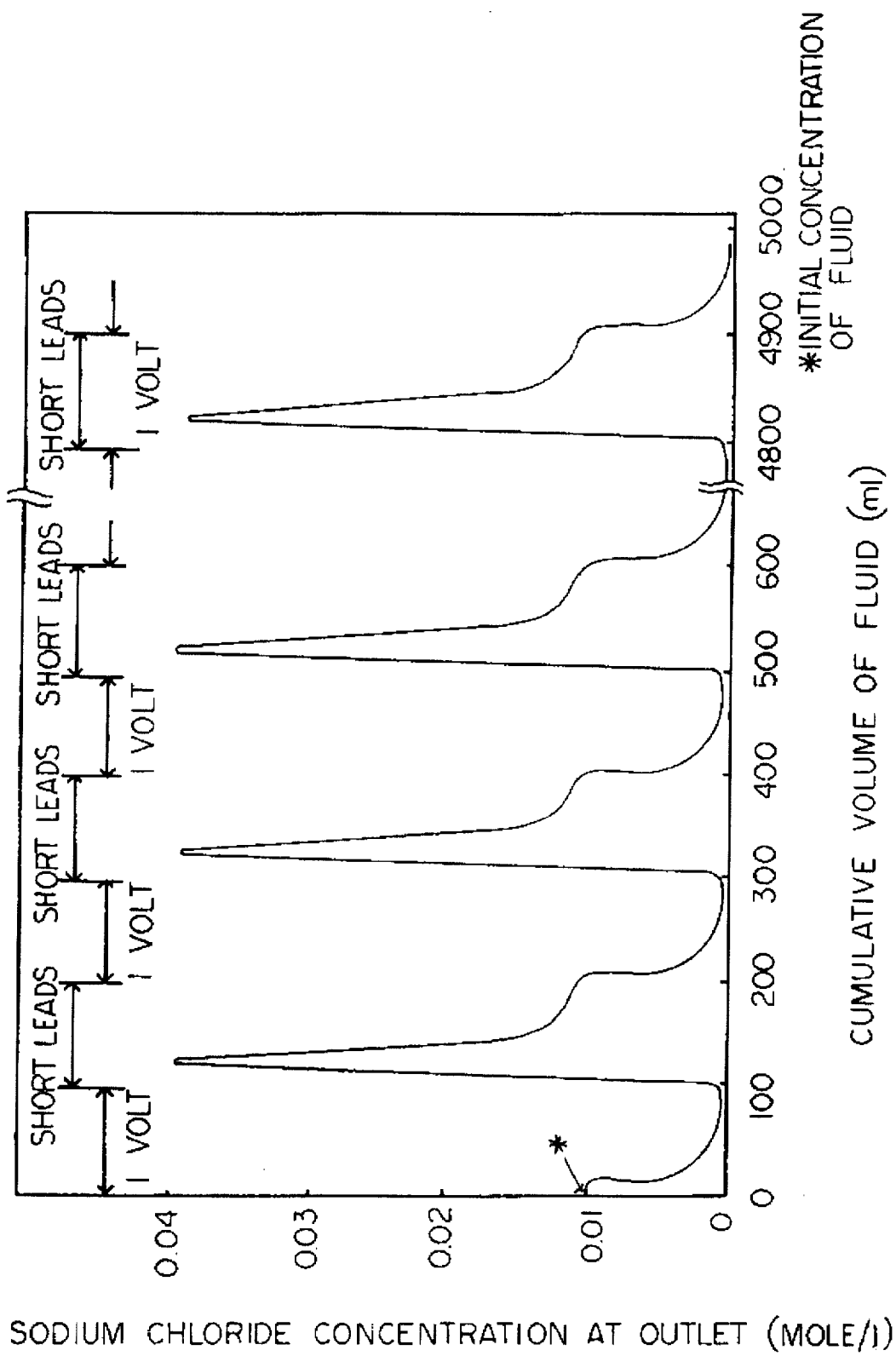
FIG. 4 is a graph showing the relation between the cumulative volume of saline passed and the outlet NaCl concentration when the saline is passed through the flow-through, electric, double-layer capacitor of FIG. 2 and application of a constant voltage and short circuiting were alternately performed in Treatment Example 2.
Figure 5:
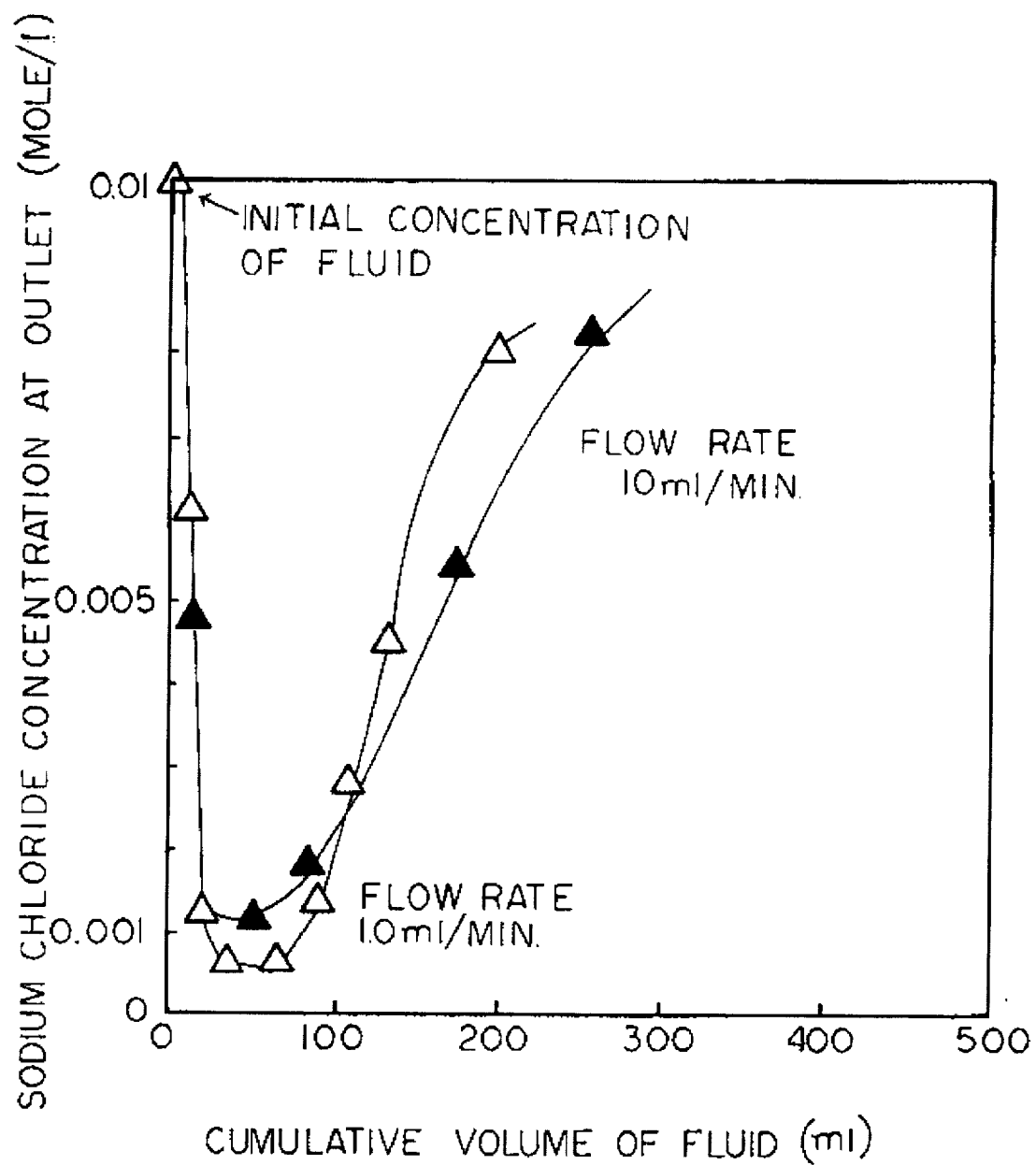
FIG. 5 is a graph showing the relations between the cumulative volume of saline and the outlet sodium chloride concentration at the flow rates of 1.0 ml/min and 10 ml/min in Treatment Example 3.
Figure 6:
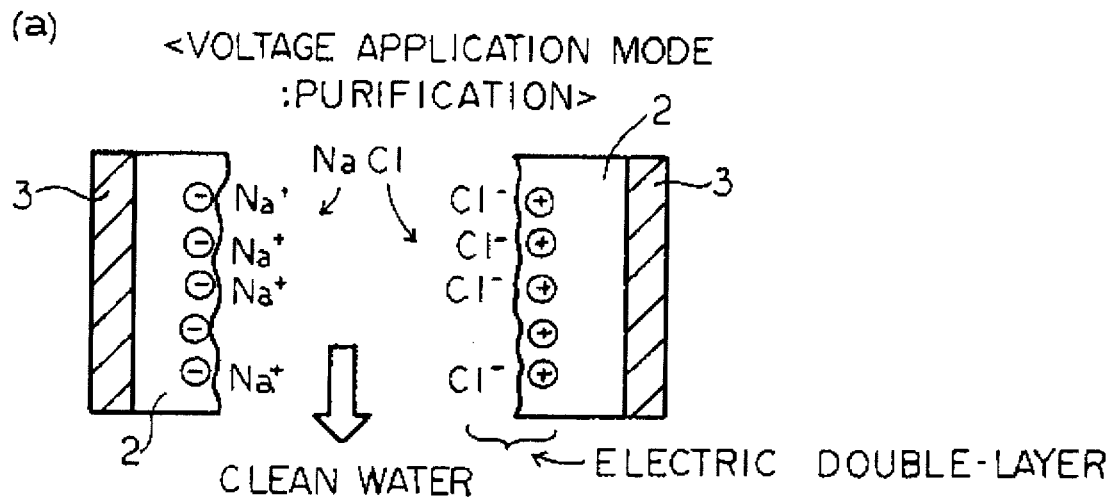
FIG. 6 is a diagram illustrating the principle of treatment of a fluid containing ionic substances using a planar, flow-through, electric, double-layer capacitor of the invention.
Figure 6:
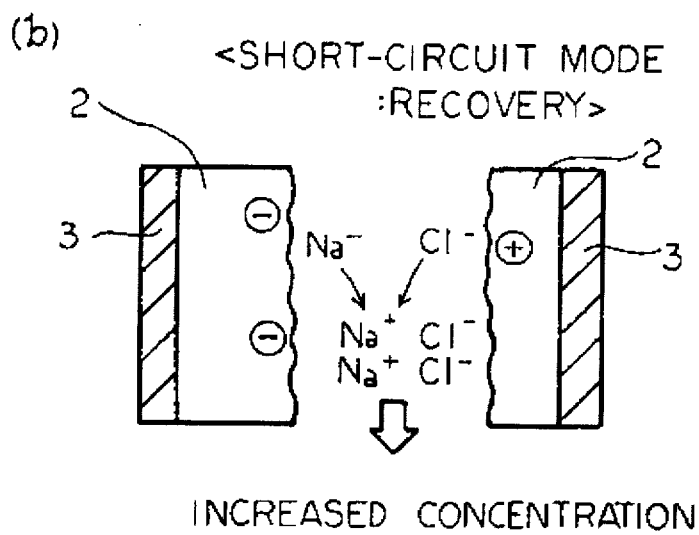

What is claimed is:

1. A planar, flow-through, electric, double layer capacitor for the treating of an ionic-containing feed fluid and obtaining a treated fluid, which capacitor comprises:

a) an electrically-insulating, separator sheet (1);

b) active carbon layers (2)(2), each comprising a high specific surface area of active carbon of greater than about 1000 B.E.T. and disposed externally on either side of the separator sheet;

c) porous electrode collector layers (3)(3), each comprising electrically conductive material and disposed externally on either side of the active carbon layers and in intimate electrical contact with each active carbon layer to form an anode and cathode electrode;

d) retaining plates (4)(4) disposed externally of said electrode collector layers to retain in uniform compaction the separator, active carbon layers and electrode collector layers together to prevent the channeling of feed and treated fluid therethrough;

e) inlet means (6) to introduce the feed fluid to be treated; and f) outlet means (7) to withdraw the treated fluid.

2. The capacitor of claim 1 which includes frame-shaped gaskets (5)(5) comprising electrically insulating material, said gaskets interposed between the said collectors (3)(3) and the retaining plates (4)(4).

3. The capacitor of claim 1 wherein the separator comprises paper, a polymer, a fiber or a cloth material.

4. The capacitor of claim 1 wherein the active carbon layers (2)(2) have a BET of not less than 1500 $m^2/g$.

5. The capacitor of claim 1 wherein the active carbon layers (2)(2) comprise a porous sheet formed from a heat-treated mixture of powdery or granular active carbon, a binder and a dispersing medium.

6. The capacitor of claim 5 wherein the said porous, formed sheet comprises active carbon having a BET of not less than 1500 $m^2/g$ and polytetrafluoroethylene, phenolic resin or carbon black or combinations thereof as a binder.

7. The capacitor of claim 1 wherein the electrode collector layers have a portion thereof with flow-through orifices (3a).

8. The capacitor of claim 1 wherein the electrode collector layers have outwardly extending, integral terminals (30) for connection to an electrical power source.

9. The capacitor of claim 1 wherein the electrode connector layers (3) (3) comprise copper plates, aluminum plates, carbon-based or graphite foils with holes therein for fluid passage.

10. The capacitor of claim 1 wherein the thickness of the active carbon layers ranges from about 0.1 mm to 3 mm and the thickness of the electrode collector layers ranges from about 0.1 mm to 0.5 mm.

11. The capacitor of claim 1 which includes a direct current, constant voltage electrical power source connected to the electrode collector layers to form an anode and a cathode, the power source having a voltage of about 0.5 to 5 volts.

12. The capacitor of claim 11 which includes means to short circuit or reverse the electrode collector layers periodically to permit the desorbing and discharging of absorbed ions from the ionic-containing feed fluid from said electrode collector layers.

13. The capacitor of claim 1 wherein the active carbon layers comprise a fibrous active carbon formed into a web.

14. The capacitor of claim 1 which comprises an assemblage of components in sequence:

a retaining plate (4) with an outlet (7); a gasket (5); a collector layer (3) having holes and with an integral extending electrical lead therefrom; an active carbon layer (2); a separator or sheet (1); an active carbon layer (2); a collector layer (3) having holes and with an integral extending electrical lead therefrom; a gasket (5) and a retaining plate (4) with an inlet (6).

15. The capacitor of claim 1 wherein the active carbon layers comprise petroleum coke active with a hydroxide and having a surface area of greater than about 2000 $m^2/g$.

16. The capacitor of claim 14 which includes fastening means to retain the assemblage of components together so that the active carbon layers (2,2) are uniformly compacted to prevent channeling of the fluid.

17. The capacitor of claim 1 wherein the electrode connector layers (3)(3) are characterized about the lower half of one electrode collector layer and about the upper half of the other electrode collector layer with similar fluid flow-through orifices (3b).

18. The capacitor of claim 17 wherein the inlet means (6) and the outlet means (7) are disposed generally opposite the orifices (30) of the electrode collector layers (3)(3).

19. The capacitor of claim 1 having a filter paper separator sheet (1), active carbon-resin layers (2)(2) in board form with holes therein, and electrode collector layers (3)(3) having fluid flow-through orifices (3b).

20. A method of treating a feed fluid containing an ionic substance which comprises:

a) providing a planar, flow-through, electric, double layer capacitor for the treating of an ionic-containing feed fluid and obtaining a treated fluid, which capacitor comprises:

i) an electrically-insulating, separator sheet (1);

ii) active carbon layers (2)(2), each comprising a high specific surface area of active carbon of greater than about 1000 B.E.T. as a main component, and disposed externally on either side of the separator sheet;

iii) porous electrode collector layers (3)(3), each comprising electrically conductive material and disposed externally on either side of said active carbon layers (2)(2), and in intimate electrical contact with each active carbon layer to form an anode and cathode electrode;

iv) retaining plates (4)(4) disposed externally of said electrode collector layers (3)(3), to retain in uniform compaction the separator, active carbon layers and electrode collector layers together and to prevent the channeling of feed fluid therethrough; and v) inlet means (6) to introduce a feed fluid to be treated; and vi) outlet means (7) to withdraw the treated fluid;

b) introducing the fluid into the inlet means (6) of the capacitor and applying a direct current, and constant voltage to said electrode collector layers (3)(3) to absorb ionic substances from the feed fluid on the active carbon layers (2)(2);

c) withdrawing a treated fluid from the outlet means (7);

d) short circuiting or reversing periodically the current or voltage to electrode connector layers (3)(3) of said capacitor to desorb ionic substances from the active carbon layers (2)(2); and e) withdrawing said desorbed ionic substances from the outlet means (7).

21. The method of claim 20 which includes applying a direct current and constant voltage source of up to about 2 volts to the electrode connector layers.

22. The method of claim 20 which includes arranging a plurality of the capacitor in a parallel array.

23. The method of claim 20 which includes short circuiting or reversing periodically the direct current or voltage when the concentration of the ionic substances in the treated fluid approaches the concentration of the ionic substances in the feed fluid.

24. The method of claim 20 which includes introducing an aqueous saline solution and withdrawing a treated fluid having a concentration of less than about 0.001 moles/liter.

25. The method of claim 20 which includes monitoring the fluid at the fluid outlet (7) and short circuiting or reversing connections responsive to said monitoring.

26. The method of claim 20 which includes controlling by a timer the short circuiting or reversing of connections.

27. The method of claim 20 wherein the fluid comprises an aqueous sodium chloride solution.

\* \* \* \* \*

UNITED STATES PATENT AND TRADEMARK OFFICE
CERTIFICATE OF CORRECTION

PATENT NO. : 5,538,611

DATED : July 23, 1996

INVENTOR(S) : Toshiro Otowa

It is certified that error appears in the above-indentified patent and that said Letters Patent is hereby corrected as shown below:

Claim 4, Column 6, line 54, delete "BET" and insert --B.E.T.--.

Claim 6, Cloumn 6, line 60, delete "BET" and insert --B.E.T.--.

Claim 16, Column 7, line 33, delete "14" and insert --1--.

Claim 18, Cloumn 7, line 44, delete "30" and insert --3b--.

Signed and Sealed this

Second Day of December, 1997

BRUCE LEHMAN

Attest:

Attesting Officer

Commissioner of Patents and Trademarks